United States Patent
Au et al.

(10) Patent No.: US 7,257,687 B2
(45) Date of Patent: Aug. 14, 2007

(54) SYNCHRONIZATION OF ACTIVE FLAG AND STATUS BUS FLAGS IN A MULTI-QUEUE FIRST-IN FIRST-OUT MEMORY SYSTEM

(75) Inventors: Mario Au, Fremont, CA (US); Jason Z. Mo, Fremont, CA (US); Cheng-Han Wu, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 380 days.

(21) Appl. No.: 11/040,804

(22) Filed: Jan. 21, 2005

(65) Prior Publication Data

US 2006/0020741 A1    Jan. 26, 2006

Related U.S. Application Data

(60) Provisional application No. 60/591,499, filed on Jul. 26, 2004, provisional application No. 60/600,347, filed on Aug. 9, 2004.

(51) Int. Cl.
| | | |
|---|---|---|
| G06F 12/00 | (2006.01) | |
| G06F 13/00 | (2006.01) | |
| G06F 13/28 | (2006.01) | |
| G06F 3/00 | (2006.01) | |
| G06F 5/00 | (2006.01) | |
| G11C 7/10 | (2006.01) | |

(52) U.S. Cl. .......................... 711/156; 710/52; 710/57; 365/189.05

(58) Field of Classification Search ................ 711/101, 711/131, 144, 149, 154, 156; 710/52, 57; 365/189.05, 189.07, 230.08
See application file for complete search history.

(56) References Cited

U.S. PATENT DOCUMENTS

| 4,486,854 | A | * | 12/1984 | Yuni .......................... 711/100 |
| 4,888,739 | A | * | 12/1989 | Frederick et al. ........... 365/221 |
| 5,084,891 | A | | 1/1992 | Ariyavisitakul et al. |
| 5,506,809 | A | * | 4/1996 | Csoppenszky et al. ...... 365/221 |
| 5,508,679 | A | | 4/1996 | McClure |
| 6,525,980 | B1 | * | 2/2003 | Au et al. ..................... 365/221 |
| 6,678,759 | B2 | * | 1/2004 | Stockton et al. .............. 710/52 |
| 2006/0017497 | A1 | | 1/2006 | Mo et al. |
| 2006/0020743 | A1 | | 1/2006 | Au et al. |

* cited by examiner

*Primary Examiner*—Donald Sparks
*Assistant Examiner*—Ryan Bertram
(74) *Attorney, Agent, or Firm*—Bever, Hoffman & Harms, LLP; E. Eric Hoffman

(57) ABSTRACT

A flag logic circuit includes a first comparator configured to generate a first flag value associated with an active read queue of a multi-queue memory device, and a second comparator configured to generate a second flag value associated with an active write queue of the multi-queue memory device. A dual-port memory is adapted to store a flag value for each queue of the multi-queue memory device. The dual-port memory has a first write port configured to receive the first flag value and a second write port configured to receive the second flag value. A first stage storage element is configured to latch each of the flag values stored in the dual-port memory in response to a first clock signal, such that the flag values are synchronized on an active status bus and flag status bus.

14 Claims, 4 Drawing Sheets

SYNCHRONIZATION OF ACTIVE FLAG AND STATUS BUS FLAGS IN A MULTI-QUEUE FIRST-IN FIRST-OUT MEMORY SYSTEM

RELATED APPLICATIONS

The present application is related to, and incorporates by reference, U.S. Provisional Patent Application Ser. No. 60/591,499 filed by Mario Au, Jason Z. Mo, Xiaoping Fang, Hui Su, Cheng-Han Wu, Ta-Chung Ma and Lan Lin on Jul. 26, 2004. The present application is also related to, and incorporates by reference, U.S. Provisional Patent Application Ser. No. 60/600,347 filed by Mario Au, Jason Z. Mo, Xiaoping Fang, Hui Su, Cheng-Han Wu, Ta-Chung Ma and Lan Lin on Aug. 9, 2004.

The present application is also related to, and incorporates by reference, the following commonly owned, co-filed U.S. patent applications.

U.S. patent application Ser. No. 11/040,892 "Multiple Counters to Relieve Flag Restriction in a Multi-Queue First-In First-Out Memory System" by Mario Au and Jason Z. Mo.

U.S. patent application Ser. No. 11/040,895 "Interleaving Memory Blocks to Relieve Timing Bottleneck in a Multi-Queue First-In First-Out Memory System" by Mario Au, Jason Z. Mo, Ta-Chung Ma and Lan Lin.

U.S. patent application Ser. No. 11/040,637 "Mark/Re-Read and Mark/Re-Write Operations in a Multi-Queue First-In First-Out Memory System" by Mario Au and Jason Z. Mo.

U.S. patent application Ser. No. 11/040,896 "Partial Packet Read/Write and Data Filtering in a Multi-Queue First-In First-Out Memory System" by Mario Au, Jason Z. Mo and Hui Su.

U.S. patent application Ser. No. 11/040,893 "Status Bus Accessing Only Available Quadrants During Loop Mode Operation in a Multi-Queue First-In First-Out Memory System" by Mario Au, Jason Z. Mo and Cheng-Han Wu.

U.S. patent application Ser. No. 11/040,926 "Multi-Queue Address Generator for Start and End Addresses in a Multi-Queue First-In First-Out Memory System" by Mario Au, Jason Z. Mo and Xiaoping Fang.

U.S. patent application Ser. No. 11/040,927 "Self-Timed Multiple Blanking For Noise Suppressiong During Flag Generation in a Multi-Queue First-In First-Out Memory System" by Mario Au and Jason Z. Mo.

FIELD OF THE INVENTION

The present invention relates to a multi-queue first in, first out (FIFO) memory.

PRIOR ART

In a conventional multi-queue FIFO memory system, flag operation for a particular queue is implemented by comparing the contents of a read counter (RCNT) associated with the queue with the contents of a write counter (WCNT) associated with the queue. A conventional multi-queue FIFO memory system typically includes a read port, which enables read accesses to be performed to any one of the multiple queues, and a write port, which enables write accesses to be performed from any one of the multiple queues. The read port operates in a first clock domain (e.g., the read clock domain), and write port operates in a second clock domain (e.g., the write clock domain), wherein the first and second clock domains are asynchronous.

FIG. 1 is a block diagram illustrating a circuit for processing almost full flag information in a conventional multi-queue FIFO memory system. (Other flag information, such as almost empty flag information, is processed in the same manner.) The circuit of FIG. 1 assumes there are a total of 128 queues in the multi-queue FIFO memory system. A first comparator 11 is coupled to receive a read count value RCNT_WQ and a write count value WCNT_WQ associated with the active write queue of the multi-queue FIFO memory system. Comparator 11 provides an almost full flag signal associated with the active write queue to first flip-flop 21.

A second comparator 12 is coupled to receive a read count value RCNT_RQ and a write count value WCNT_RQ associated with the active read queue of the multi-queue FIFO memory system. In response, the second comparator 12 provides an almost full flag signal associated with the active read queue to flag status register file 30. A decoding function within flag status register file routes the almost full flag signal to a location associated with the active read queue. This decoding function introduces signal delay to the almost full flag signal. Flag status register file 30 stores an almost full flag signal for each of the 128 queues.

The almost full flag signals provided by comparators 11 and 12 are simultaneously latched into flip-flop 11 and flag status register file 30, respectively, in response to the same clock signal (WCK1). The first flip-flop 11 provides the almost full flag signal associated with the active write queue to a second flip-flop 22. The flag status register file 30 provides a subset of the 128 stored almost full flag signals to flip-flops 40-47. The second flip-flop 22 and flip-flops 40-47 are clocked by the same clock signal (WCK2). The second flip-flop 22 provides the almost full flag signal associated with the active write queue on the active status bus. Flip-flops 40-47 provide a set of eight almost full flag signals on the flag status bus. At least some of the almost full flag signals on the flag status bus are associated with inactive queues. Note that one of the almost full flag signals provided on the flag status bus may be the same almost full flag signal provided on the active status bus.

As described above, the decoding function implemented by flag status register file 22 introduces a signal delay to the almost full flag signal provided by comparator 12. This may introduce a problem, which is described in more detail below. Suppose that the active write queue is the same queue as the active read queue (i.e., read and write operations are simultaneously being performed to the same queue). Further suppose that comparators 11 and 12 are both transitioning to indicate that the active write queue, and therefore the active read queue, have become almost full. Flip-flop 21 may properly latch the almost full flag signal provided by comparator 11, while flag status register file 30 may fail to properly latch the almost full flag signal provided by comparator 12, as a result of the signal delay introduced by the decoding function of flag status register file 30. In this case, flip-flop 21 and flag status register 22 will store inconsistent information regarding the almost full status of the active write queue. This inconsistent information will confuse the user of the system.

It would therefore be desirable to have a method and structure of synchronizing the active status flag and the flag status bus in a multi-queue FIFO memory system.

As described above, a multi-queue FIFO memory typically includes one or more flag status buses. Each flag status bus includes a plurality of bits that can simultaneously show the status of a group of queues. For example, a multi-queue FIFO memory system having 128 queues can be logically divided into different 16 groups having eight queues each. Thus, queues 0 to 7 may correspond to group 0, queues 8 to 15 may correspond to group 1, and queues 120 to 127 may correspond to group 15. The status bus is capable of simultaneously providing the status of each group of queues.

The status bus can operate in two modes: direct mode and loop mode. During loop mode operation, the status of each group of queues is output to the bus sequentially on the rising edge of a loop clock signal. Traditionally, this type of looping operation is repeated every 16 cycles to show the status of all of the groups of queues, regardless of how many queues the multi-queue FIFO device is actually implementing. For example, if the multi-queue FIFO memory system is programmed to use 26 queues, during the loop mode, the status bus will sequentially output queue groups 0, 1, 2, . . . 14, 15. Even though there are no queues in queue groups 5 to 15, dummy values are output to the status bus during the cycles associated with these queue groups. Thus, during each loop, after receiving valid queue information for five cycles, the user has to wait 11 extra cycles before receiving more valid queue information.

It would therefore be desirable to have a method and structure for more efficiently implementing a flag status bus looping operation in a multi-queue FIFO memory system.

SUMMARY

Accordingly, the present invention provides a flag logic circuit that includes a first comparator configured to generate a first flag value associated with an active read queue of a multi-queue memory device, and a second comparator configured to generate a second flag value associated with an active write queue of the multi-queue memory device. The first and second flag values are provided to first and second write ports, respectively, of a dual-port memory. The first flag value is written to an address in the dual-port memory associated with the active read queue. The second flag value is written to an address in the dual-port memory associated with the active write queue. The dual-port memory stores a plurality of flag values, including a flag value for each queue of the multi-queue memory device.

A first stage storage element is configured to latch each of the flag values stored in the dual-port memory in response to a first clock signal, such that the flag values are synchronized for subsequent output on an active status bus and a flag status bus.

The flag logic circuit also includes a first multiplexer configured to route a flag value associated with the active read queue (or the active write queue, depending on the flag type) from the first stage storage element as an active status flag. The flag logic circuit also includes a second multiplexer configured to route a subset of the flag values in the first stage storage element as a set of status flags.

The flag logic circuit can further include a second stage storage latch coupled to receive the active status flag provided by the first multiplexer, and a second stage storage register coupled to receive the set of status flags provided by the second multiplexer. The second stage storage latch and the second stage storage register are configured to operate in response to a second clock signal. The second stage storage latch provides the active status flag to the active status bus, and the second stage storage register provides the retrieved set of status flags to the flag status bus.

In accordance with another embodiment, the flag logic circuit can include a first blanking circuit coupled between the first comparator and the first write port of the dual-port memory, and a second blanking circuit coupled between the second comparator and the second write port of the dual-port memory.

The present invention will be more fully understood in view of the following description and drawings.

DETAILED DESCRIPTION

Figure 1:
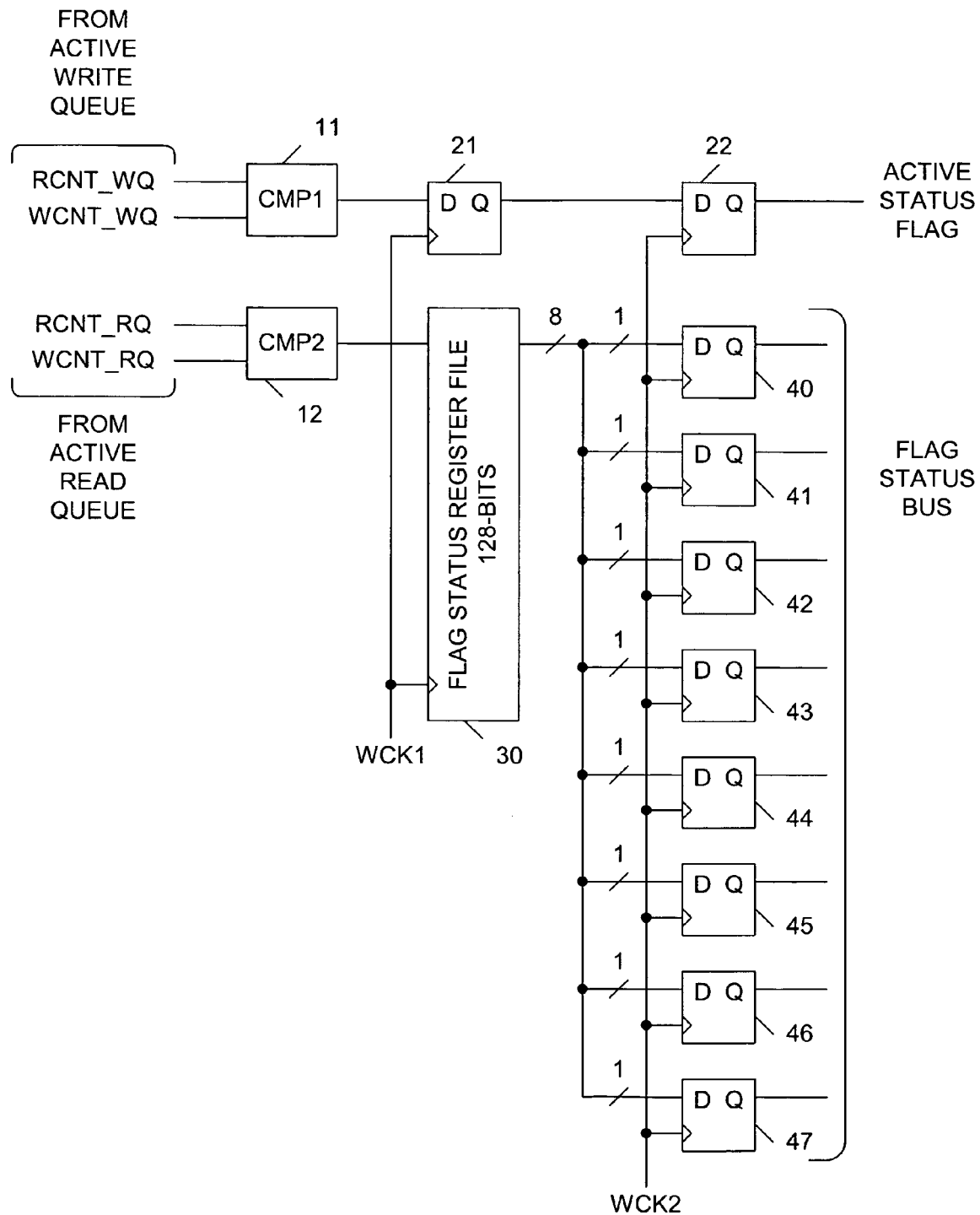
FIG. 1 is a block diagram illustrating a conventional circuit for processing flag information in a multi-queue memory system.

The present invention includes a multi-queue flow-control device, which is implemented on a single chip. The multi-queue device can be configured to implement between 1 and 128 discrete FIFO queues. The user has full flexibility configuring queues within the device, being able to program the total number of queues between 1 and 128. The user can also independently select the individual queue depths.

All queues within the device have a common data input bus (write port), and a common data output bus (read port). Data written to the write port is directed to a respective queue via an internal de-multiplexer, which is addressed by a user. Data read from the read port is accessed from a respective queue via an internal multiplexer, addressed by the user. Data writes and reads can be performed at high speeds (up to 200 MHz, with access times of 3.6 ns in accordance with one embodiment of the present invention). Data write and read operations are totally independent of each other. Thus, a queue may be selected on the write port, and a different queue may be selected on the read port. Alternately, read and write operations may be selected on the same queue simultaneously.

The device provides a Full Flag (FF#) and an Empty Flag (EF#) that identify the status of the queues selected for write and read operations, respectively. The device also provides a Programmable Almost Full Flag (PAF#) and a Programmable Almost Empty Flag (PAE#) that identify the status of the queues selected for write and read operations, respectively. The positions of the PAF# and PAE# flags are programmable by the user. The flags for queue N are specified by the flag name, followed by N (e.g., PAF#_N).

The multi-queue FIFO memory system of the present invention also includes one or more flag status buses. Each flag status bus includes a plurality of bits that simultaneously show the flag status of a plurality of different queues. For example, a programmable almost full flag status bus may show the programmable almost full status of eight different queues at the same time.

In accordance with one embodiment of the present invention, the multi-queue FIFO memory system includes a dual-port memory and a plurality of first stage flip-flops, which are shared by an active status flag and an associated flag status bus (e.g., PAF# and PAF#_N). Both the dual-port memory and the first stage flip-flops have a capacity of 128-bits, one bit for each of the 128 possible queues of the multi-queue FIFO memory system.

A first flag comparator provides flag status information relating to the active read queue of the multi-queue FIFO, and a second flag comparator provides flag status information relating to the active write queue of the multi-queue FIFO. The outputs of the first and second flag comparators are written to a dual-port memory via first and second write ports of the dual-port memory, respectively. More specifically, the outputs of the first and second flag comparators are written to addresses in the dual-port memory associated with the active read queue and the active write queue, respectively.

The contents of the dual-port memory are simultaneously stored in the first stage flip-flops in response to a first clock signal, such that no clock skew exists with respect to the flag information stored in the first stage flip-flops.

A 128-to-1 multiplexer is located between the first stage flip-flops and a second stage flip-flop. The 128-to-1 multiplexer routes one of the flags stored in the first stage flip-flops as the active status flag to the second stage flip-flop. The flag routed by the 128-to-1 multiplexer is selected in response to the present read or write queue address, depending on the flag type. The active status flag is stored in the second stage flip-flop in response to a second clock signal.

A 128-to-8 multiplexer is located between the first stage flip-flops and a set of eight second stage flip-flops. The 128-to-8 multiplexer routes eight of the flags stored in the first stage flip-flops as the status bus flags to the second stage flip-flops. The flags routed by the 128-to-8 multiplexer can be selected in a variety of ways, including, but not limited to, strobing or looping. The status bus flags are stored in the second stage flip-flops in response to the second clock signal. Thus, the active status flag and the status bus flags are simultaneously latched in response to the second clock signal. Because the active status flag and the status bus flags are commonly clocked into the first stage flip-flops and second stage flip-flops, the active status flag necessarily has the same state as the corresponding status bus flag. As a result, any clock skew problem is eliminated.

Figure 2:
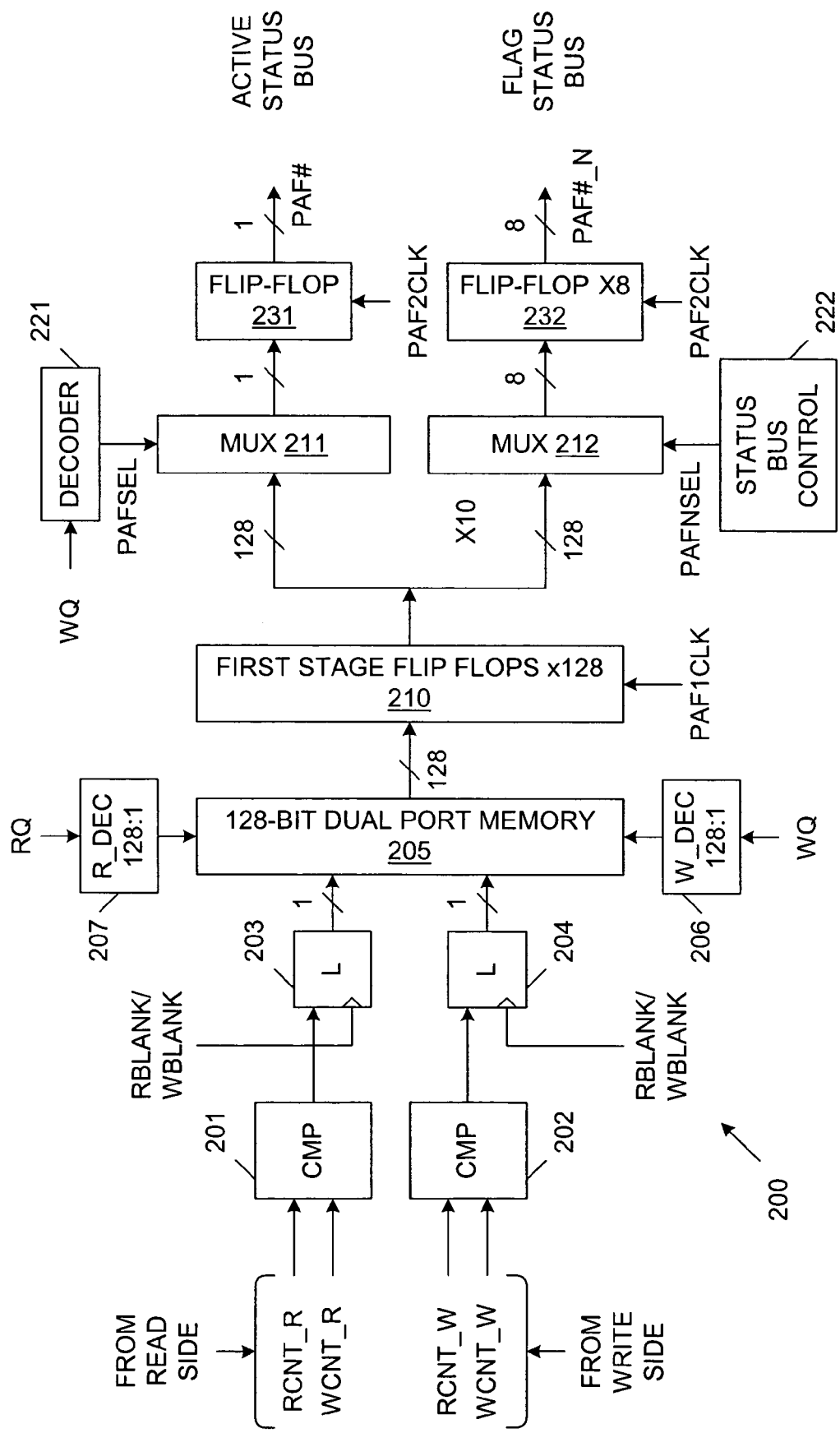
FIG. 2 is a block diagram illustrating logic for generating an active programmable almost full flag PAF# and programmable almost full status bus flags PAF#_N in accordance with one embodiment of the present invention.

FIG. 2 is a block diagram illustrating write flag logic 200 for generating the active programmable almost full flag PAF# and the programmable almost full status bus flags PAF#_N. Logic 200 includes comparators 201-202, blanking latches 203-204, 128-bit dual-port memory 205, 128:1 write side decoder 206, 128:1 read side decoder 207, first stage flip-flops 210, 128:1 active flag multiplexer 211, 128:8 status bus multiplexer 212, write queue decoder 221, status bus control circuit 222, second stage flip-flop 231, and second stage flip-flop set 232.

Comparator 201 is configured to receive a read count pointer and a write count pointer from the read side of a multi-queue FIFO memory system. More specifically, comparator 201 is configured to receive the read count pointer RCNT_R and the write count pointer WCNT_R associated with the active read queue of the multi-queue FIFO memory system. Note that a read operation from the active read queue may cause the read count pointer RCNT_R to increment with respect to the write count pointer WCNT_R, thereby causing the active read queue to transition from an "almost full" condition (PAF#=0) to a "not almost full" condition (PAF#=1). When comparator 201 determines that the active read queue has transitioned from an "almost full" condition to a "not almost full" condition, this comparator 201 provides a logic "1" output signal. The logic "1" output signal provided by comparator 201 represents the desired state of the PAF# flag associated with the active read queue, which should be changed from a logic "0" state to a logic "1" state to indicate that the active read queue is no longer almost full.

The logic "1" output signal provided by comparator 201 is stored in blanking latch 203 in response to the blanking signals RBLANK/WBLANK. In general, these blanking signals are controlled to activate latches 203-204 at times when read and write related noise is at a minimum. Blanking latch 203 is described in more detail in commonly owned, co-filed U.S. patent application Ser. No. 11/040,927, "Self-Timed Multiple Blanking for Noise Suppression During Flag generation in a Multi-Queue First-In First-Out Memory System, by Mario Au and Jason Z. Mo.

Comparator 202 is configured to receive a read count pointer and a write count pointer from the write side of the multi-queue FIFO 100. More specifically, comparator 202 is configured to receive the write count pointer WCNT_W associated with the active write queue, and the read count pointer RCNT_W associated with the active write queue. The write count pointer WCNT_W and read count pointer RCNT_W are used to generate the programmable almost full flag PAF# associated with the active write queue. Note that a write operation to the active write queue may cause the write count pointer WCNT_W to increment with respect to the read count pointer RCNT_W, thereby causing the active write queue to transition from a "not almost full" condition (PAF#=1) to an "almost full" condition (PAF#=0). When comparator 202 determines that the active write queue has transitioned from a "not almost full" condition to an "almost full" condition, this comparator 202 provides a logic "0" output signal. The logic "0" output signal provided by comparator 202 represents the desired state of the PAF# flag associated with the active write queue, which should be changed from a logic "1" state to a logic "0" state to indicate that the active write queue is now almost full.

The logic "0" output signal provided by comparator 202 is stored in blanking latch 204 in response to the blanking signals RBLANK/WBLANK. Blanking latch 204 operates in the same manner as blanking latch 203.

The PAF# flag stored in blanking latch 203 is written to a location in 128-bit dual-port memory 205 associated with the active read queue. The PAF# flag stored in blanking latch 203 is written via a first write port of dual-port memory 205. The first write port of dual-port memory 205 is accessed by read side decoder 207, which operates in response to a control signal RQ identifying the active read queue. For example, if the active read queue is queue "5", read side decoder 207 enables the PAF# flag stored in blanking latch 203 to be written to the entry of dual-port memory 205 associated with queue "5" (e.g., address location "5").

Similarly, the PAF# flag stored in blanking latch 204 is written to a location in 128-bit dual-port memory 205 associated with the active write queue. The PAF# flag stored in blanking latch 204 is written via a second write port of dual-port memory 205. The second write port of dual-port memory 205 is accessed by write side decoder 206, which operates in response to a control signal WQ identifying the active write queue. For example, if the present write queue is queue "87", write side decoder 206 enables the PAF# flag stored in blanking latch 204 to be written to the entry of dual-port memory 205 associated with queue "87" (e.g., address location "87"). Because the PAF# flags stored in blanking latches 203 and 204 are written to different write ports of dual-port memory 205, these PAF# flags can be simultaneously written to memory 205, without any timing delay or signal skew.

The PAF# flags stored in 128-bit dual-port memory 205 are applied to 128 corresponding first stage flip-flops 210. These PAF# flags are simultaneously latched into the 128 first stage flip-flops 210 in response to a first programmable almost full clock signal PAF1CLK, which is a delayed version of the write clock signal. The 128 PAF# flags stored in first stage flip-flops 210 are provided to 128:1 active flag multiplexer 211 and 128:8 status bus multiplexer 212. Write queue decoder 221 receives the address WQ of the active write queue, and in response, provides a select signal PAFSEL that identifies the active write queue. The PAFSEL signal is provided to the control terminals of 128:1 multiplexer 211, thereby causing this multiplexer 211 to route the PAF# flag associated with the active write queue from first stage flip-flops 210 to second stage flip-flop 231.

Status bus control circuit 222 provides a select signal PAFNSEL that identifies a set of eight queues. The PAFNSEL signal is provided to multiplexer 212, thereby causing multiplexer 212 to route the eight PAF# flags associated with the identified set of eight queues from first stage flip-flops 210 to second stage flip-flops 232.

The above-described PAF# flags are simultaneously latched into second stage flip-flop 231 and second stage flip-flops 232 in response to a second programmable almost full clock signal PAF2CLK, which is synchronized with the write clock signal. Advantageously, the active flag PAF# and the status bus flags PAF#_N are simultaneously latched into second stage flip-flops 231 and 232, such that no signal skew exists with respect to the flags stored in the second stage flip-flops.

Figure 3:
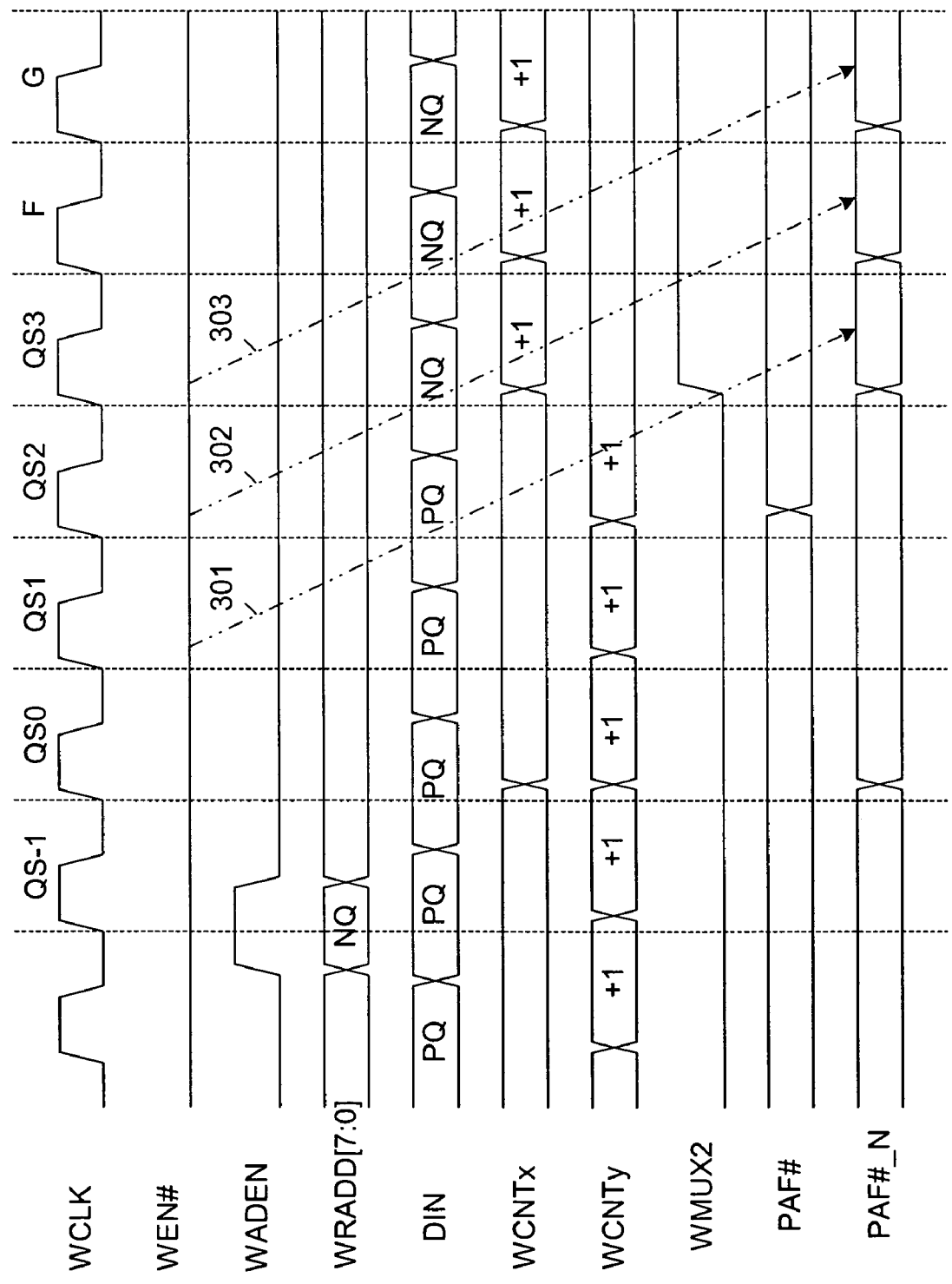
FIG. 3 is a waveform diagram illustrating the operation of the logic of FIG. 2 during a write queue switch in accordance with one embodiment of the present invention.

FIG. 3 is a waveform diagram illustrating the operation of the logic 200 of FIG. 2 during a write queue switch, wherein write operations transition from a present queue PQ to a new queue. A write queue switch is described in more detail in commonly-owned, co-filed U.S. patent application Ser. No. 11/040,892, "Multiple Counters to Relieve Flag Restriction in a Multi-Queue First-In First-Out Memory System", by Mario Au and Jason Z. Mo.

In general, a write queue switch is initiated in cycle QS-1 in response to the activated write address enable signal WADEN and the write address signal WRADD[7:0] (which identifies the address of the new write queue). Write operations are performed to the present write queue PQ during cycles QS-1, QS0, QS1 and QS2. During these cycles, a multiplexer control signal WMUX2 has a logic low state, thereby causing the write count value WCNTy associated with the present queue to be routed as the WCNT_W signal, and used to generate the PAF# flag associated with the present queue.

During cycle QS1, write decoder 206 continues to address the location within dual-port memory 205 associated with the present queue PQ. During cycle QS2, the PAF# flag associated with the present queue is latched into first stage flip-flops 210 in response to the PAF1CLK signal. During cycle QS3, the PAF# flag associated with the present queue is available to be latched into second stage flip-flops 232 in response to the PAF2CLK signal. If latched, this PAF# flag is provided as one of the status bus flags PAF_N during cycle QS3. This sequence is represented by dashed line 301 in FIG. 3.

During cycle QS2, write decoder 206 continues to address the location within memory 205 associated with the present queue PQ. During cycle QS3, the PAF# flag associated with the present queue is latched into first stage flip-flops 210 in response to the PAF1CLK signal. During cycle F, the PAF# flag associated with the present queue is available to be latched into second stage flip-flops 232 in response to the PAF2CLK signal. If latched, this PAF# flag is provided as one of the status bus flags PAF_N during cycle F. This sequence is represented by dashed line 302 in FIG. 3.

During cycle QS3, write decoder 206 addresses the location within memory 205 associated with the new queue NQ. Also during cycle QS3, a multiplexer control signal WMUX2 transitions from a logic low state to a logic high state, thereby causing the write count value WCNTX associated with the new queue to be routed as the WCNT_W signal, and used to generate the PAF# flag associated with the new queue. During cycle F, the PAF# flag associated with the new queue is latched into first stage flip-flops 210 in response to the PAF1CLK signal. During cycle G, the PAF# flag associated with the new queue is available to be latched into second stage flip-flops 232 in response to the PAF2CLK signal. If latched, this PAF# flag is provided as one of the status bus flags PAF_N during cycle G. This sequence is represented by dashed line 303 in FIG. 3.

Note that during cycle QS1, write queue decoder 221 decodes the address of the new queue NQ, such that the PAF# flag associated with the new queue is routed from first stage flip-flops 210 to second stage flip-flop 231. During cycle QS2, the PAF2CLK signal causes the PAF# flag associated with the new queue to be latched into second stage flip-flop 231 and provided as the active PAF# flag. The active PAF# flag associated with the new queue can be updated from the read side during cycles QS3 or F, because the earliest that a write operation can be performed to the new queue is during cycle QS3.

The active programmable almost empty flag PAE# and the programmable almost empty status bus flags PAE#_N are generated in the same manner as the active PAF# flag and the PAF#_N flags.

As described above, the multi-queue FIFO memory system of the present invention includes one or more flag status buses. In the described embodiments, each flag status bus has eight bits that can simultaneously show the status of one "quadrant". The 128 queues are divided into sixteen different quadrants having eight queues each. For example, queues 0 to 7 correspond to quadrant 0, queues 8 to 15 correspond to quadrant 1, and queues 120 to 127 correspond to quadrant 15. Each flag status bus can operate in two modes: direct mode and loop mode. During direct mode, the desired quadrant is accessed in response to a user provided address. During loop mode operation, the status of each quadrant is sequentially output to the flag status bus in response to a clock signal (e.g., the PAF2CLK signal).

In accordance with one embodiment, a protocol is provided to eliminate any queues in the loop mode that do not contain valid flag status bits. The number of quadrants that the flag status bus must cycle through depends on the number of queues the multi-queue FIFO memory system is configured to implement. If the multi-queue FIFO memory system is configured to implement "m" queues, the system must cycle through $((m-(m \bmod 8))/8+1)$ quadrants. During loop mode, the flag status bits are output sequentially by quadrant, with the flag status bits of quadrant 0 provided first. After providing the flag status bits of quadrant $((m-(m \bmod 8))/8)$, the system loops back to quadrant 0 again. This enables the user to collect the status of the used quadrants more frequently, without having to filter invalid flag status bits from unused quadrants.

Figure 4:
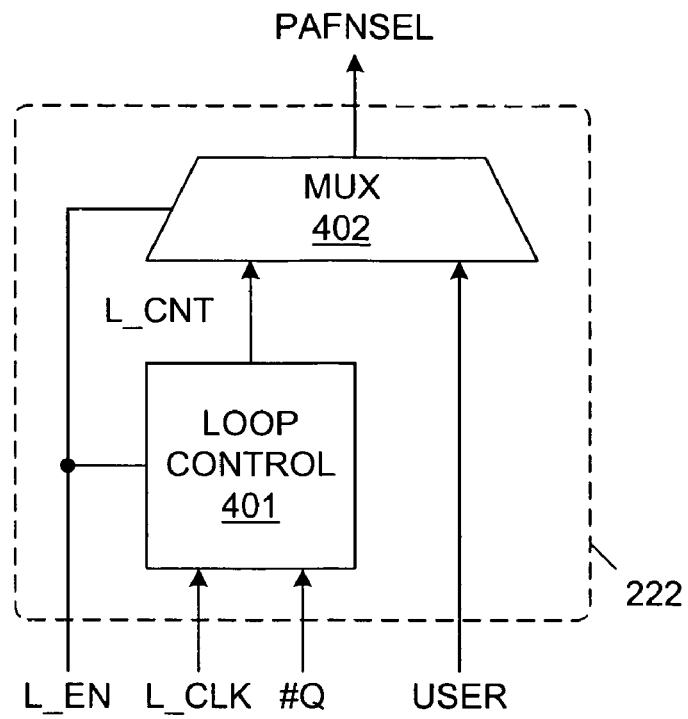
FIG. 4 is a block diagram of a status bus control circuit in accordance with one embodiment of the present invention.

FIG. 4 is a block diagram of status bus control circuit 222 (FIG. 2) in accordance with one embodiment of the present invention. Status bus control circuit 222 includes loop control circuit 401 and multiplexer 402. Loop control circuit 401 receives a loop enable signal L_EN, a loop clock signal L_CLK and a queue number value Q#, which identifies the number of active queues used by system 100. In response, loop control circuit 401 provides a loop count value L_CNT, which identifies the quadrant to be accessed. Multiplexer 402 receives the loop count value L_CNT and a user quadrant value USER. Multiplexer 402 routes either the loop count value L_CNT or the user quadrant value USER in response to the loop enable signal L_EN.

Figure 5:
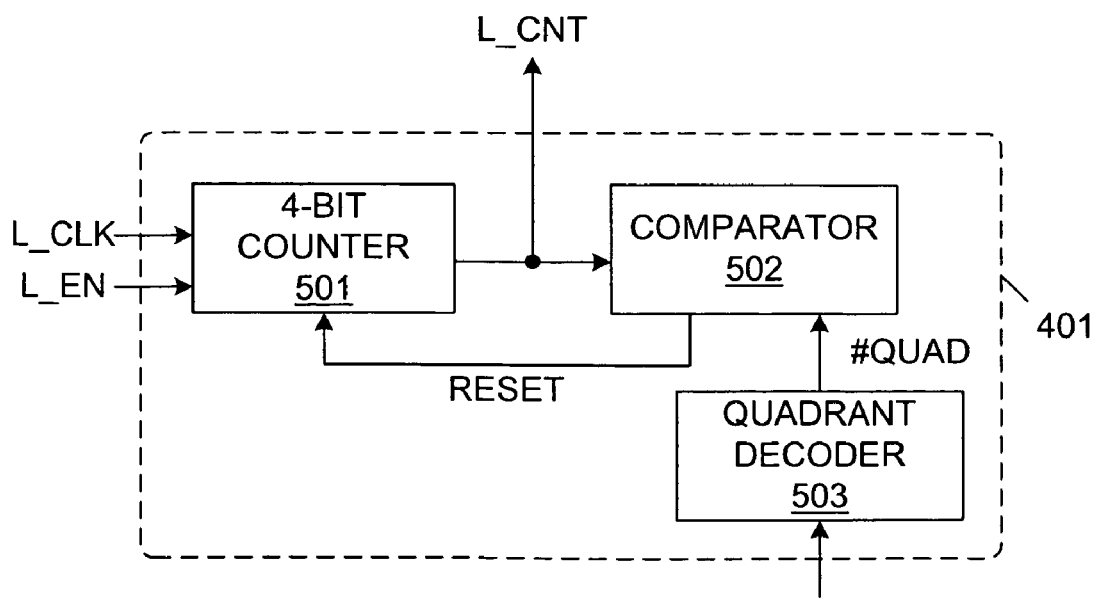
FIG. 5 is a block diagram of a loop control circuit in accordance with one embodiment of the present invention.

FIG. 5 is a block diagram of loop control circuit 401 in accordance with one embodiment of the present invention. Loop control circuit 401 includes 4-bit counter 501, comparator 502 and quadrant decoder 503. Counter 501 receives the loop enable signal L_EN and the loop clock signal L_CLK, and in response, provides the loop count value L_CNT. The loop count value L_CNT is also provided to comparator 502. Quadrant decoder 503 receives the #Q value, which identifies the number of queues used in the present device configuration, and in response, provides a quadrant control value #QUAD that indicates the number of quadrants required by the number of queues, #Q. The #QUAD value is applied to comparator 502. Comparator 502 compares the #QUAD and L_CNT values, and in response, provides a RESET signal to counter 501.

In direct mode, the loop enable signal L_EN is deactivated, thereby disabling counter 501, and causing the user quadrant value USER to be routed through multiplexer 402 as the PAFNSEL control signal. In response to the PAFNSEL signal, the 128:8 multiplexer 212 (FIG. 2) routes a quadrant of eight PAF# flags.

In loop mode, the loop enable signal L_EN is activated, thereby enabling counter 501 and causing the loop count value L_CNT to be routed through multiplexer 402 as the PAFNSEL control signal. Counter 501 is initially reset to a zero count (i.e., "0000"), such that the loop count value L_CNT initially identifies quadrant 0. As a result, multiplexer 212 initially routes the eight PAF# flags of quadrant 0. As described above, the queue number value #Q identifies the number of queues used by system 100 in the present design. Quadrant decoder 503 determines the number of quadrants required to implement the number of queues identified by the queue number value #Q, and provides the result as the quadrant number value #QUAD. For example, if the queue number value #Q indicates that 46 of the possible 128 queues are used in the present design, then quadrant decoder 503 generates a #QUAD value equal to 6 (i.e., "0110"). As described above, the quadrant value is determined by solving for ((46−(46 mod 8))/8 +1), which is equal to 6.

Counter 501 counts up from the initial zero count in response to the loop clock signal L_CLK. Thus, during the first six cycles of the loop clock signal, the loop count signal L_CNT has successive values of "0000", "0001", "0010", "0011", "0100" and "0101". During these first six cycles, multiplexer 212 routes the PAF# flags of quadrant 0, quadrant 1, quadrant 2, quadrant 3, quadrant 4 and quadrant 5. During the seventh cycle, the loop count signal L_CNT reaches a value of "0110", thereby matching the #QUAD value provided by quadrant decoder 503. In response to this match, comparator 502 activates the RESET signal, thereby causing counter 501 to be reset to the zero count "0000". As a result, multiplexer 212 again routes the PAF# flags of quadrant 0. In the foregoing manner, the L_CNT value effectively cycles from a zero count of "0000" to a count of "0101", and then back to the zero count. As a result, the PAF# flags of quadrants 0 to 5 are repeatedly routed by multiplexer 212 to the PAF# status bus. Advantageously, no time is wasted routing the PAF# flags associated with the unused quadrants 6-15.

Although the invention has been described in connection with several embodiments, it is understood that this invention is not limited to the embodiments disclosed, but is capable of various modifications, which would be apparent to one of ordinary skill in the art. Thus, the present invention is only intended to be limited by the following claims.

We claim:

1. A flag logic circuit comprising:
a first comparator configured to generate a first flag value associated with an active read queue of a multi-queue memory device;
a second comparator configured to generate a second flag value associated with an active write queue of the multi-queue memory device;
a dual-port memory adapted to store a flag value for each queue of the multi-queue memory device, the dual-port memory having a first write port configured to receive the first flag value and a second write port configured to receive the second flag value; and
a first stage storage element configured to latch each of the flag values stored in the dual-port memory in response to a first clock signal.

2. The flag logic circuit of claim 1, wherein the dual-port memory is configured to write the first flag value to a location in the dual-port memory associated with the active read queue, and configured to write the second flag value to a location in the dual-port memory associated with the active write queue.

3. The flag logic circuit of claim 1, further comprising:
first means for routing a flag value associated with the active read queue or the active write queue from the first stage storage element as an active status flag; and
second means for routing a subset of flag values from the first stage storage element as a set of status flags.

4. The flag logic circuit of claim 3, wherein the first means comprises:
a first select circuit having input terminals coupled to receive the flag values stored in the first stage storage element, control terminals coupled to receive a control value that identifies the active read queue or the active write queue, and an output terminal configured to provide the active status flag.

5. The flag logic circuit of claim 4, wherein the second means comprises:
a second select circuit having input terminals coupled to receive the flag values stored in the first stage storage element, control terminals coupled to receive a control value that identifies the subset of flags values, and output terminals configured to provide the set of status flags.

6. The flag logic circuit of claim 5, wherein the first means further comprises a second stage storage latch coupled to receive the active status flag provided on the output terminal of the first select circuit, and wherein the second means further comprises a second stage storage register coupled to receive the set of status flags provided on the output terminals of the second select circuit.

7. The flag logic circuit of claim 6, wherein the second stage storage latch and the second stage storage register are configured to operate in response to a second clock signal.

8. The flag logic circuit of claim 1, further comprising:
a first blanking circuit coupled between the first comparator and the first write port of the dual-port memory; and a second blanking circuit coupled between the second comparator and the second write port of the dual-port memory.

9. A method comprising:

generating a first flag value associated with an active read queue of a multi-queue memory device;

generating a second flag value associated with an active write queue of the multi-queue memory device;

writing the first flag value to a dual-port memory through a first write port of the dual-port memory;

writing the second flag value to the dual-port memory through a second write port of the dual-port memory;

storing a flag value associated with each queue of the multi-queue memory device in the dual-port memory;

latching each of the flag values stored in the dual-port memory into a first stage storage element in response to a first clock signal.

10. The method of claim 9, further comprising operating the active write queue in an asynchronous manner with respect to the active read queue.

11. The method of claim 9, further comprising:

writing the first flag value to a location in the dual-port memory associated with the active read queue; and writing the second flag value to a location in the dual-port memory associated with the active write queue.

12. The method of claim 9, further comprising:

routing a flag value associated with the active read queue or the active write queue from the first stage storage element as an active status flag; and routing a subset of flag values from the first stage storage element as a set of status flags.

13. The method of claim 12, further comprising latching the active status flag and the set of status flags in response to a second clock signal.

14. The method of claim 9, further comprising performing noise blanking on the first and second flag values prior to writing the first and second flag values to the dual-port memory.

* * * * *